H. HOWARD.
PROCESS AND APPARATUS FOR CALCINING CHEMICAL PRODUCTS.
APPLICATION FILED APR. 30, 1915.

1,173,428. Patented Feb. 29, 1916.

INVENTOR.
Henry Howard
BY
Byrnes Townsend & Buckenster
ATTORNEYS.

UNITED STATES PATENT OFFICE.

HENRY HOWARD, OF BROOKLINE, MASSACHUSETTS.

PROCESS AND APPARATUS FOR CALCINING CHEMICAL PRODUCTS.

1,173,428.

Specification of Letters Patent. Patented Feb. 29, 1916.

Application filed April 30, 1915. Serial No. 25,055.

*To all whom it may concern:*

Be it known that I, HENRY HOWARD, a citizen of the United States, residing at Brookline, in the county of Norfolk and State of Massachusetts, have invented certain new and useful Improvements in Processes and Apparatus for Calcining Chemical Products, of which the following is a specification.

The object of this invention is to provide a simple and efficient apparatus for concentrating and calcining chemical products, the typical product chosen for illustration being aluminum sulfate. The invention also includes the novel process involved.

A preferred form of apparatus embodying the invention is illustrated in the accompanying drawings, wherein—

Figure 1:
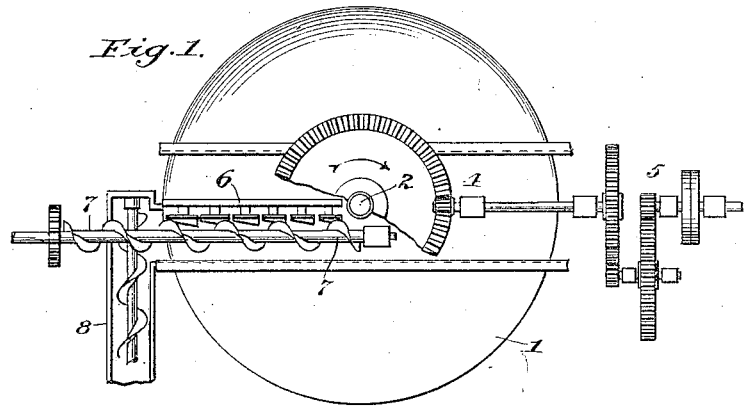
Figure 2:
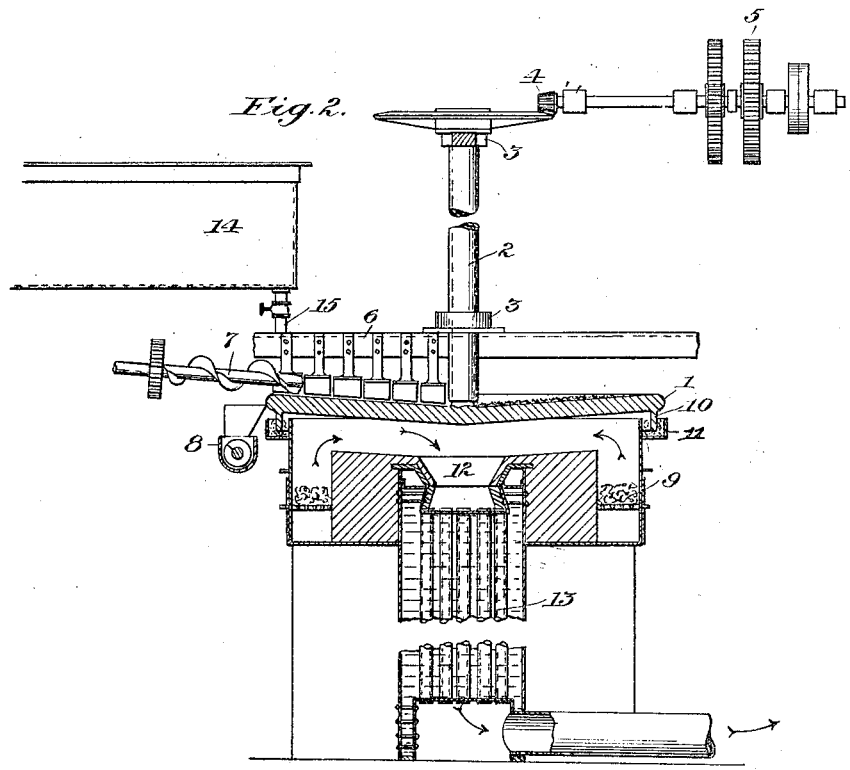

Figure 1 is a plan view of the apparatus, parts being broken away; and Fig. 2 is a central vertical section thereof.

Referring to said drawings, 1 represents a plate which is preferably of cast iron and is revolubly mounted. As illustrated, the plate 1 is carried by a central vertical upwardly-extending shaft 2, supported in suitable bearings 3, 3 and adapted to be rotated slowly by the bevel-gear 4 and reduction gearing 5. The plate 1 is slightly coned to present a concave upper face. The discharging means for the calcined precipitate comprise fixed scrapers 6 disposed above and in proximity to the plate and extending substantially radially from the center to the circumference; and a screw-conveyer or equivalent mechanical device 7 arranged parallel to the scraper 6 and to the upper surface of the plate, and serving to move the deposit loosened by the scrapers toward the periphery of the plate, and to discharge it into a cross-conveyer 8.

Beneath the plate 1 is a coal or other suitable furnace in the form of an annulus 9, constructed to afford an even distribution of the heat over the entire lower surface of the plate. The gases of combustion are prevented from escaping around the edges of the plate by a peripheral flange 10 depending into an annular sealing trough 11, which may be filled with fine sand or other sealing substance. As illustrated, the gases are withdrawn downwardly through a central flue 12, in which is located any suitable form of heat-economizer, as for example a steam-boiler 13, the steam being used for the preliminary concentration of the sulfate solution or applied otherwise as desired.

14 represents a storage tank containing the hot strong aluminum sulfate solution, and 15 the valved discharge pipe therefrom. The operation of this apparatus is as follows: The aluminum sulfate solution having been concentrated to a suitable degree, say 50 to 55° Baumé more or less, is kept fluid by heat in the storage tank 14, and is permitted to flow slowly through pipe 15 onto the peripheral portion of the slowly rotating coned plate 1. This plate is quite strongly heated to a temperature which depends largely upon its rate of rotation, but which in practice may, for the specific material chosen for illustration, be just below a red heat. The strong solution thus discharged upon the periphery of the plate flows toward the center, meantime evaporating and depositing a crust of aluminum sulfate. During the balance of the rotation this crust is calcined, and is finally loosened by the scrapers and removed by the conveyer 7. It is thereby delivered to the conveyer 8, which discharges it either directly into the packages for shipment, or into suitable mills when it is desired to pulverize it.

It will be observed that the aluminum sulfate first flows inwardly from the peripheral portion of the heated plate in the form of a film or stream undergoing rapid evaporation: the deposited crust is then calcined during the slow rotation of the plate, and is ultimately loosened and broken up by the scrapers and re-conveyed outwardly to the periphery of the plate in the form of a loose mass. This final stage of the process, including the breaking up and moving of the hot crust, is effective in completing the calcination.

A further important advantage resulting from the use of a shallow concave hearth with peripheral feed is as follows: Since the fluid sulfate solidifies progressively in its flow, it follows that the molten stream becomes smaller and smaller as it flows toward the central portion of the plate. But since in its flow it moves toward the center of the plate, this smaller stream suffices to cover the surface. Hence by properly regulating the peripheral feed, with reference to the size, rate of rotation and temperature of the plate, it is possible to obtain a practically uniform deposit over the entire area of the plate. Obviously, a similar result cannot be secured if the molten charge is fed to the central portion of a plate and permitted to flow toward the periphery.

I claim:—

1. In a calcining furnace, the combination of a rotary plate having a concave upper face, means for heating said plate, means for supplying a fluid charge thereto, and discharging means acting to move the calcined charge from the inner portion of the plate toward its periphery.

2. In a calcining furnace, the combination of a rotary plate having a concave upper face, means for heating said plate, means for supplying a fluid charge thereto, and discharging means comprising scraper and conveyer elements acting to detach the calcined charge from the plate and to move it from the inner portion of the plate toward the periphery thereof.

3. In a calcining furnace, the combination of a rotary plate having a concave upper face, means for heating said plate, means for supplying a fluid charge to the peripheral portion of the plate, and discharging means acting to move the calcined charge from the inner portion of the plate toward its periphery.

4. In a calcining furnace, the combination of a rotary plate having a concave upper face in the form of a shallow cone, means for heating said plate, means for supplying a fluid charge to the peripheral portion of the plate, and discharging means acting to move the calcined charge from the inner portion of the plate toward its periphery.

5. In a calcining furnace, the combination of a rotary plate having a concave upper face, means for heating said plate, means for supplying a fluid charge to the peripheral portion of the plate, and means for removing the calcined charge.

6. In a calcining furnace, the combination of a rotary plate having a concave upper face in the form of a shallow cone, an annular furnace located beneath the peripheral portion of the plate and provided with a central flue, means for feeding a fluid charge to the peripheral portion of the plate, and discharging means comprising scraper and conveyer elements acting to detach the calcined charge from the plate and to move it from the inner portion of the plate toward the periphery thereof.

7. The herein-described process of calcining chemical products, which consists in heating a moving surface to the temperature required for effecting calcination of the said product, feeding the product to said surface in fluid form and removing it therefrom in solid form, and causing the fluid and solid products to traverse said surface in substantially opposite directions.

8. The herein-described process of calcining chemical products, which consists in heating a moving surface to the temperature required for effecting calcination of the said product, feeding the product to said surface in fluid form and removing it therefrom in solid form, the fluid material moving over the heated surface from the peripheral portion toward the center, and the calcined solid moving from the central portion toward the periphery.

In testimony whereof I affix my signature in presence of two witnesses.

HENRY HOWARD.

Witnesses:
I. M. GRAHAM,
M. V. O'BRIEN.